Aug. 6, 1929.  W. H. HOLTOM  1,723,651
LOCOMOTIVE AUXILIARY ENGINE REVERSING MECHANISM
Filed Aug. 25, 1926
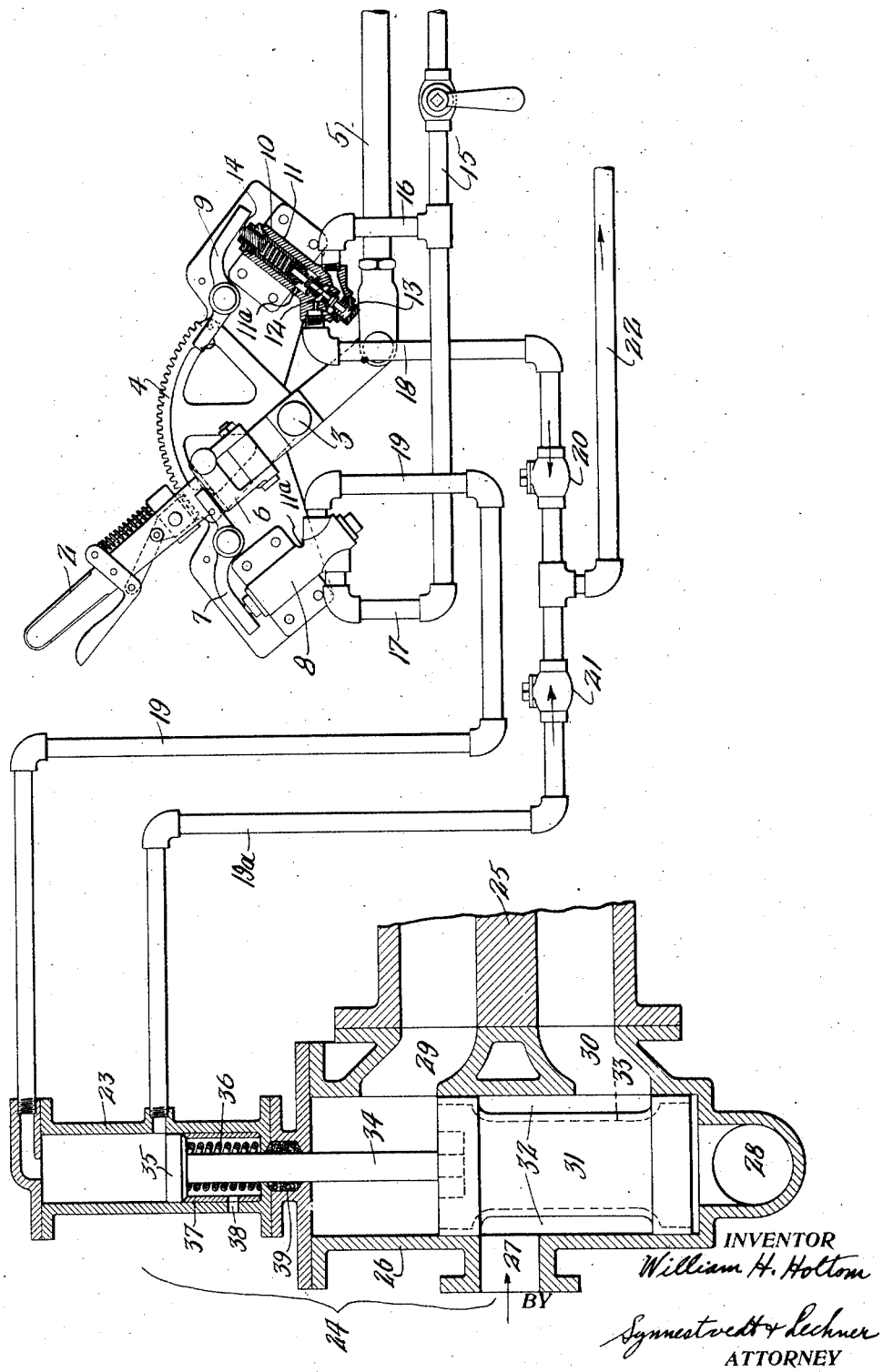
INVENTOR
William H. Holtom
BY
Synnestvedt & Lechner
ATTORNEY Patented Aug. 6, 1929.

1,723,651

UNITED STATES PATENT OFFICE.

WILLIAM H. HOLTOM, OF JACKSON, MICHIGAN, ASSIGNOR TO FRANKLIN RAILWAY SUPPLY COMPANY, OF NEW YORK, N. Y., A CORPORATION OF DELAWARE.

LOCOMOTIVE AUXILIARY ENGINE-REVERSING MECHANISM.

Application filed August 25, 1926. Serial No. 131,403.

This invention relates to mechanism for reversing an auxiliary or booster motor used to drive one or more normally idle pairs of wheels on a locomotive, or other railway vehicle, such booster motors being now commonly used to assist the main engines of the locomotive in starting and at low speeds.

One of the primary objects of the present invention is to increase the usefulness of the booster by making it possible to utilize its power conveniently when operating the locomotive in reverse position.

Another principal object is to accomplish the foregoing result without adding to the duties and burdens of the engineman incident to the usual operation of the locomotive.

More specifically this invention contemplates the provision of means operable by the usual locomotive reversing mechanism to reverse the booster engine automatically.

How the foregoing, together with such other objects and advantages as are incident to the invention, are obtained, will be evident to those skilled in the art from the following description and accompanying drawing of the present preferred embodiment of the invention.

In the drawing, which shows, partly in elevation and partly in section, the mechanism employed in carrying out the invention, I have illustrated a common type of locomotive power reverse lever 2, pivoted at 3 at the center of the arc of its quadrant 4, and pivotally connected to a rod 5 for operating the power reverse mechanism (not known). The lever 2 is shown in reverse position with the booster latch 6 in engagement with the operating lever 7 of the booster reverse pilot valve 8. The latch 6 is pivotally mounted on the side of the lever 2, so that, at the will of the engineman, it may be swung up into the position shown, or down, so that it will not engage the booster pilot valves. The construction and operation of the latch is well understood in this art in connection with the usual operation of the booster when the locomotive is run in forward position, the usual booster pilot valve being located substantially in the position of applicant's present forward pilot valve 10, and having an operating lever 9 substantially as here employed.

The construction of the pilot valves, as shown in section by the forward pilot valve 10, is well known in the art (forming, per se no part of this invention), and comprises a valve casing 11 with the usual exhaust part 11ª, a valve member 12, normally held in closed position by the spring 13 and the pressure fluid from pipe 15, and a spring-cushioned operating plunger 14, adapted to open the valve when depressed by the operating lever 9 when the latter is engaged by the booster latch 6 upon movement of the reverse lever 2 down into the corner. It has become the practice, in the art, to utilize such a pilot valve to admit compressed air, or other fluid under pressure, to the booster controlling mechanism, which latter I have not here illustrated, but which may include means for successively idling the booster, entraining it with the axle to be driven, opening the main booster throttle, and performing other operations, an example of such booster controlling mechanism being illustrated in the patent to Peters, No. 1,470,761, issued October 16, 1923.

The apparatus of the present invention is adapted to be used in conjunction with a booster motor which is reversible by a reversal of the direction of the steam admitted to the steam chests thereof, and includes, in addition to means for supplying the usual fluid pressure to the booster controlling mechanism, a simple and reliable means for controlling the direction of admission of steam to the booster motor, both of said means being operable by, and under the control of, the usual reversing mechanism of the main engines of the locomotive. In my device, fluid pressure is admitted from a pipe 15 through branch pipes 16 and 17 to the forward and reverse pilot valves 10 and 8, respectively. When the locomotive reverse lever 2 is in extreme, or nearly extreme, forward position, it actuates the valve 10 (through the latch mechanism before described) to admit pressure through pipe 18 and check valve 20, to pipe 22, which leads to the booster controlling mechanism (not shown), the pressure being prevented from entering pipe 19ª by the check valve 21. Check valves 20 and 21 may be of any suitable known type, and are both set to permit a flow only toward the pipe 22, as indicated by the arrows, and not the reverse. When the reverse lever is in reverse position (the position shown in the drawing), valve 8 is opened to admit pressure through pipe 19, cylinder 23, pipe 19ª, and check valve 21, to pipe 22, and thence to the booster controlling mechanism as before.

In either of the foregoing operations, the steam reversing valve mechanism, indicated as a whole by the numeral 24, comes into operation. This valve may be placed at any convenient point, and, in the drawing, is shown as being mounted on the booster motor, a portion of which is indicated at 25. The valve mechanism 24 has a casing 26, with a steam supply connection 27 from the booster throttle (not shown), an exhaust passage or port 28, and ports 29 and 30 connecting to the booster steam chests. A piston valve 31 having an annular passage 32 around it and a longitudinal passage 33 extending through it, is connected, by a stem or rod 34, to a piston 35 operating in the chamber or cylinder 23, said piston being operable in one direction by the expansion of spring 36 behind it, and in the other direction by the fluid pressure admitted to the cylinder through pipe 19. An annular seat 37 limits the movement of the piston under the force of the fluid pressure, and an open port 38 is provided from the space behind the piston to the atmosphere to prevent the building up of pressure, or the formation of a vacuum therein. Suitable packing 39 may be provided to prevent leakage of steam from the valve around the stem or rod 34.

In practice, the operation of the device is as follows:

When the locomotive is starting or running, at long cut-off, forwardly, the booster latch 6, having previously been swung up into operating position by the engineman, engages the operating lever 9 of the forward pilot valve 10, which admits fluid pressure from pipe 15 by way of pipes 16 and 18 and the check valve 20 to pipe 22 leading to the booster controlling mechanism. Since pilot valve 8 is closed and check valve 21 prevents any back flow of pressure into pipe 19ª, there will be no pressure admitted into cylinder 23, and the piston 35 will, therefore, be held at the head of the cylinder under the pressure of spring 36, for at this time, cylinder 23 and pipe 19 are open to atmosphere through the usual exhaust port 11ª of the pilot valve 8. Valve 31 will, therefore, be at the position opposite to that shown in the drawing, permitting a flow of steam from port 27 through passage 32 around the valve to port 29 to the booster motor, such flow of steam occurring when the booster controlling mechanism (not shown), by the pressure admitted thereto through pipe 22, has opened the booster throttle. The booster will then be operating forwardly, and the exhaust therefrom will pass out through port 30 directly to the exhaust passage 28 of the steam reversing valve 24.

When operating in reverse, the position shown in the drawing, the reverse pilot valve 8 admits pressure from pipe 15, through pipes 17 and 19, to cylinder 23, forcing the piston to the position shown, thereby moving valve 31 to open a steam passage from port 27 through the annular passage 32 to port 30, and thence to the booster, so that, by the time the fluid pressure has passed from cylinder 23 through pipe 19ª, check valve 21 and pipe 22 to the booster controlling mechanism and the booster throttle has been opened thereby, the flow of steam to the booster will be in a direction opposite to that first described, the booster then operating in reverse, and the exhaust therefrom taking a course out through port 29 through the longitudinal central opening 33 of the valve 31 to the exhaust passage or port 28.

From the foregoing, it will be seen that the ports 29 and 30 serve as admission and exhaust ports, respectively, when the engine is operating forwardly, and the booster motor then operates forwardly; while, when the engine is operating in reverse, the position of valve 31 is reversed, port 30 serves as an admission port and port 29 as an exhaust port, and the booster motor then operates in the reverse direction.

It will further be evident that the present device is entirely automatic in character, and is under the influence of the main locomotive reversing mechanism; that it is very simple in character, and easy of application to existing equipment; and that it may be thrown into or out of operation, at the will of the engineman, by the usual booster latch.

It is also obvious that it is within the scope of the present invention to apply it in conjunction with other forms of locomotive reversing mechanisms or apparata.

I claim:—

1. A reversing mechanism for locomotive booster motors of a type reversible by reversal of the steam flow thereto, comprising, in combination with the locomotive reverse lever, a valve normally in position to admit steam to the booster in a direction to drive it forwardly, and means actuated by the reverse lever when in reverse position for moving said valve to reverse the flow of steam to the booster.

2. Locomotive auxiliary engine reversing mechanism for engines reversible by reversal of the steam flow, comprising, in combination with the main locomotive reversing mechanism, means actuated thereby and adapted to reverse the direction of steam flow to the auxiliary engine upon reversal of said main locomotive reversing mechanism.

3. Locomotive auxiliary engine reversing mechanism for engines reversible by reversal of the steam flow, comprising, in combination with the main locomotive reversing mechanism, means operable thereby to reverse the direction of steam flow to the auxiliary engine, and consisting of a fluid pressure controlling valve for the control of the auxiliary engine actuated by said main reversing mechanism, a steam control valve normally positioned to admit steam to the auxiliary engine in one direction, and means actuated by the operation of said fluid pressure controlling valve to move the steam control valve to a position to reverse the flow of steam to the auxiliary engine.

4. Locomotive auxiliary engine reversing mechanism for engines reversible by reversal of the steam flow, comprising, in combination with the main locomotive reversing mechanism, means operable thereby to reverse the direction of steam flow to the auxiliary engine, and consisting of a pair of fluid pressure controlling valves for the control of the auxiliary engine, one of which is actuated by the main reversing mechanism when the latter is in forward position, and the other when it is in reverse position, and each of which is adapted to admit fluid pressure to the auxiliary engine controlling system when so actuated, a steam control valve normally positioned to admit steam to the booster in a direction for forward operation thereof when the first mentioned fluid pressure controlling valve is actuated by the main reversing mechanism, and means operable by the second mentioned fluid pressure controlling valve adapted to reverse the position of said steam control valve to admit steam to the booster in a direction for reverse operation thereof when said second mentioned fluid pressure controlling valve is actuated by the main reversing mechanism.

5. Locomotive booster reversing mechanism for boosters reversible by reversal of the steam flow thereto, comprising, in combination with the main locomotive reversing mechanism, a forward pilot valve for admitting fluid pressure to the booster controlling system and actuated by the main reversing mechanism when the latter is in forward position, a reverse pilot valve for admitting fluid pressure to the booster controlling system and actuated by the main reversing mechanism when the latter is in reverse position, and a steam reversing valve normally positioned to admit steam to the booster in a direction to drive it forwardly when the forward pilot valve is actuated, together with means under the influence of the reverse pilot valve adapted to shift said steam reversing valve to a position in which it will admit steam to the booster in a direction to drive it backwardly when the reverse pilot valve is actuated.

6. In locomotive booster reversing mechanism for boosters reversible by reversal of the steam flow thereto, the combination of a main locomotive reversing mechanism, a booster pilot valve operable thereby, a fluid pressure connection from said valve leading to the booster controlling system, a cylinder interposed therein, a piston in said cylinder, means normally holding said piston in a position toward the inlet end of said cylinder in the absence of fluid pressure, and a valve actuated by the piston and providing in one position steam admission and exhaust connections to the booster in a predetermined direction and in the other position steam admission and exhaust connections in an opposite direction.

7. In locomotive booster reversing mechanism for boosters reversible by reversal of the steam flow thereto, a steam reversing valve having a steam inlet port and a steam exhaust port, a pair of ports connecting to the booster, and means for connecting the inlet port to one of said ports to the booster and the exhaust port to the other or the reverse.

8. In locomotive booster reversing mechanism for boosters reversible by reversal of the steam flow thereto, a steam reversing valve having a steam inlet port and a steam exhaust port, a pair of ports connecting to the booster, and means for connecting the inlet port to one of said ports to the booster and the exhaust port to the other or the reverse, said means comprising a valve chamber communicating with said ports, and a valve member movable therein and provided with an annular groove around its periphery and a longitudinal passage therethrough.

In testimony whereof I have hereunto signed my name.

WILLIAM H. HOLTOM.